US 8,155,130 B2

(12) United States Patent
McGrew et al.

(10) Patent No.: US 8,155,130 B2
(45) Date of Patent: Apr. 10, 2012

(54) ENFORCING THE PRINCIPLE OF LEAST PRIVILEGE FOR LARGE TUNNEL-LESS VPNS

(75) Inventors: David McGrew, Poolesville, MD (US); Brian Weis, San Jose, CA (US); W. Scott Wainner, Sterling, VA (US)

(73) Assignee: Cisco Technology, Inc., San Jose, CA (US)

( * ) Notice: Subject to any disclaimer, the term of this patent is extended or adjusted under 35 U.S.C. 154(b) by 405 days.

(21) Appl. No.: 12/186,044

(22) Filed: Aug. 5, 2008

(65) Prior Publication Data

US 2010/0034207 A1    Feb. 11, 2010

(51) Int. Cl.
*H04L 12/28* (2006.01)
*H04L 12/56* (2006.01)
*G04F 7/00* (2006.01)
*G04F 17/00* (2006.01)
*G04F 15/16* (2006.01)

(52) U.S. Cl. .......................................... 370/401; 726/12
(58) Field of Classification Search ................... 370/389, 370/401; 726/15, 2, 3, 11, 12
See application file for complete search history.

(56) References Cited

U.S. PATENT DOCUMENTS

| | | | | |
|---|---|---|---|---|
| 6,079,020 A * | 6/2000 | Liu | ................................. | 726/15 |
| 6,981,064 B1 * | 12/2005 | Phadnis et al. | ................. | 709/250 |
| 7,447,901 B1 * | 11/2008 | Sullenberger et al. | ........ | 713/153 |
| 7,650,500 B2 * | 1/2010 | Matoba | ......................... | 713/163 |
| 2004/0057579 A1 * | 3/2004 | Fahrny | ............................ | 380/44 |
| 2004/0202184 A1 * | 10/2004 | Yazaki et al. | ............. | 370/395.31 |
| 2005/0033956 A1 * | 2/2005 | Krempl | ......................... | 713/156 |
| 2005/0157664 A1 * | 7/2005 | Baum et al. | .................... | 370/256 |
| 2006/0184999 A1 * | 8/2006 | Guichard et al. | ................. | 726/3 |
| 2007/0248225 A1 * | 10/2007 | Fluhrer | ........................... | 380/30 |
| 2009/0328192 A1 * | 12/2009 | Yang et al. | ...................... | 726/15 |

OTHER PUBLICATIONS

Oltsik, J., "CipherOptics Meets Agile Network Encryption (ANE) and Marries Network Encryption to Business Needs" *Enterprise Strategy Group* dated Feb. 10, 2006 (5 pages).
"CipherOptics: Data Protection Solutions" MPLS Networks, *Copyright© CipherOptics 2006* (15 pages).
"CiperOptics: Network-Wide Data Protection" A Policy Key Management Architecture Primer for Business Leaders, *Copyright© CipherOptics 2006* (15 pages).

* cited by examiner

*Primary Examiner* — Ayaz Sheikh
*Assistant Examiner* — Tarell Hampton
(74) *Attorney, Agent, or Firm* — Hickman Palermo Truong & Becker LLP; Daniel D. Ledesma

(57) ABSTRACT

Techniques for secure communication in a tunnel-less VPN are provided. A key server generates and provides, to each VPN gateway, different, yet mathematically-related keying material. A VPN gateway receives distinct keying material for each designated address block (e.g., subnet) behind the VPN gateway. In response to receiving a packet from one a source host whose address falls within one of the designated address blocks, the VPN gateway identifies the appropriate keying material. The VPN gateway determines an identifier for the address block that includes the destination address. The identifier and the identified keying material are used to generate a key. The VPN gateway encrypts the packet with the key and forwards the encrypted packet to the destination host.

22 Claims, 4 Drawing Sheets

ENFORCING THE PRINCIPLE OF LEAST PRIVILEGE FOR LARGE TUNNEL-LESS VPNS

TECHNICAL FIELD

The present disclosure generally relates to secure communication in a tunnel-less Virtual Private Network (VPN).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Tunnel-less encrypted Virtual Private Networks (VPNs) use a group key to add confidentiality and/or integrity protection to packets, within a VPN, that are private to an enterprise or other organization using the VPN. An example of a technology that can be used to establish tunnel-less encrypted and/or integrity-protected VPN is Group Encrypted Transport VPN, or GET VPN, commercially available from Cisco Systems, Inc., San Jose, Calif. Data packets are encapsulated as Internet Protocol security (IPsec) packets but the outer IP header holds the source and destination host addresses rather than the addresses of IPsec gateways. Also, in a tunnel-less VPN, one VPN gateway does not necessarily know the addresses of the other VPN gateways in the network. A benefit of a tunnel-less VPN over traditional "tunneled" VPNs is that an encrypted packet can be routed according to the service provider's route table. Thus, an encrypted packet can take advantage of redundant routes through the service provider to the destination. That is, packets encrypted by any customer edge (CE) device are decrypted at any receiving CE device, depending on how routing in the private network forwarded the encrypted packet. The use of group security enables a level of redundancy and scalability not economically achievable with the use of Internet Key Exchange (IKE)/IPsec tunnels.

In GET VPN, all VPN gateways share the same group key. An attacker successfully penetrating any GET VPN gateway may find the opportunity to extract the group key used by all GET VPN gateways, and thus can impersonate any GET VPN gateway and/or can derive the plain-text for any intercepted packet sent as part of the group. However, this risk is mitigated within many private networks because the CE devices often reside in customer premises, and are physically secured. Notwithstanding, in some cases where routers are not adequately physically secured or are placed on premises not controlled by the system administrator, use of a single group key is not sufficient. Thus, there is a need to increase the security of communications between the GET VPN gateways by mitigating these risks.

DESCRIPTION OF EXAMPLE EMBODIMENTS

Figure 1A:
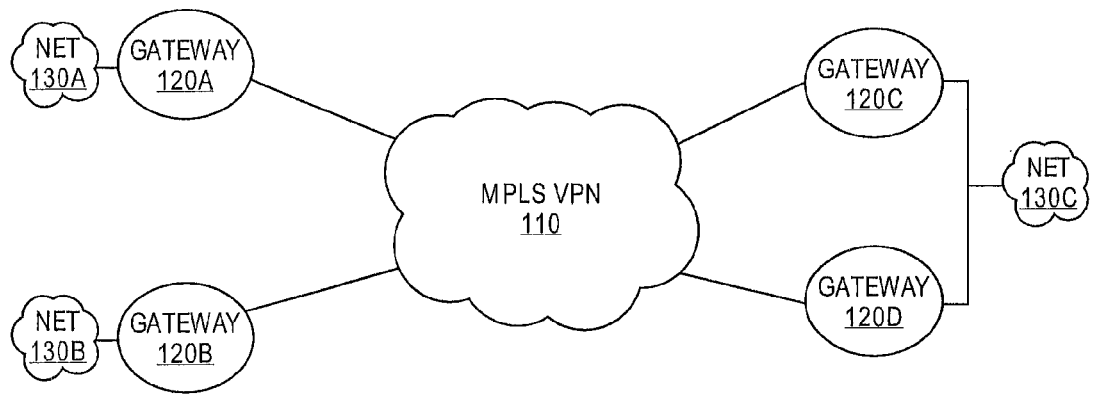
FIG. 1A and FIG. 1B illustrate VPN gateways in a tunnel-less VPN.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
        2.1 Determining the KGS Identity Associated With an Address Block
        2.2 KGS Identity Semantics
        2.3 Multiple KGS Identities Behind a Single VPN Gateway
        2.4 Example Packet Processing at a VPN Gateway
        2.5 Multiple KGS Systems
        2.6 Benefits
    3.0 Implementation Mechanisms—Hardware Overview
    4.0 Extensions and Alternatives 1.0 General Overview Security in a tunnel-less VPN is described. In an embodiment, a packet is received at a VPN gateway in the tunnel-less VPN. The packet originated at a source host and includes a source address of the source host and a destination address of a destination host. The VPN gateway determines a first address block that includes the source address. The VPN gateway determines a particular key based on the first address block and a particular identifier associated with a second address block that includes the destination address. The VPN gateway uses the particular key to encrypt and/or provide integrity protection on at least a portion of the packet. The VPN gateway then forwards the packet (including the encrypted or integrity-protected portion) to the destination host.

In one feature, the VPN gateway identifies keying material associated with the first address block based on, e.g., on a mapping. The keying material is used in combination with the particular identifier to generate the particular key.

In a related feature, the VPN gateway identifies the keying material from a plurality of keying materials wherein each keying material is associated with a different address block. In another feature, the particular key is stored (e.g., cached) for subsequent use. In another feature, the VPN gateway determines the particular key based on a mapping between the second address block and the particular identifier.

In another feature, the VPN gateway receives a second packet that includes a second destination address that is included in a third address block that is different than the second address block. The VPN gateway determines a second identifier associated with the third address block. The VPN gateway determines (e.g., generates or retrieves) a second key based on the second identifier. The VPN gateway encrypts the second packet with the second key and forwards the encrypted packet to the host associated with the second destination address.

As used herein, "encrypting a packet" includes encrypting a portion (e.g., the payload), but not all, of the packet. Accordingly, an "encrypted packet" is a packet where at least some portion of the packet is encrypted.

Although the following description discloses that keys are used to encrypt/decrypt packets, keys may also be used to provide integrity protection to packets. A VPN may be run with integrity protection and no encryption. Although not commonly done, integrity protection is considered quite useful. Thus, in an embodiment, a source VPN gateway uses a key to "integrity protect" a packet and a destination VPN gateway uses a key to "integrity check" an integrity-protected packet.

Integrity protection may be provided on data by using a secret-key integrity protection algorithm, such as HMAC-SHA1. RFC 2404, "The Use of HMAC-SHA-1-96 within ESP and AH", describes how HMAC-SHA1 can be used in a VPN context, and is incorporated herein by reference as if fully disclosed herein.

2.0 Structural and Functional Overview

In an embodiment, in network elements implementing tunnel-less VPNs, all group members use the same group key to encrypt or decrypt any data packet in the network, and the set of group members authorized to encrypt or decrypt a packet comprises only those group members that require the key. Group members that do not require the key do not receive the key, even though such group members remain in the group.

According to an embodiment, a set of VPN gateways register with a key server, such as a key server implemented using Group Domain of Interpretation (GDOI). The registration process may involve the key server authenticating each of the VPN gateways and providing a policy to each VPN gateway. Based on the address space for which a particular VPN gateway is responsible, the key server provides different, yet mathematically-related, keying material to each of the gateways in the VPN.

FIG. 1A is a diagram that depicts VPN gateways 120A-D in a tunnel-less VPN 110. In an example embodiment, VPN gateway 120A protects net 130A; VPN gateway 120B protects net 130B; and VPN gateways 120C and 120D protect (for redundancy) net 130C. For purposes of brevity, "VPN gateway" is referred to hereinafter as "gateway."

Each of nets 130A-C represents an address block (e.g., network prefix), which is a contiguous set of IP addresses that can be represented as a range of addresses in the IPsec architecture (e.g., ID_IPV4_ADDR_SUBNET or ID_IPV6_ADDR_SUBNET defined in RFC 2407). In order to encrypt or decrypt a network packet, the IPsec subsystem on a gateway matches attributes such as the source and/or destination addresses of the packet against the gateway's Security Policy Database (SPD). If the gateway finds a match, then the gateway requires an IPsec security association (SA) (including a session key) in order to encrypt or decrypt the packet.

In an embodiment, the principle of least privilege is enforced, such that gateway 120A only needs shared subgroup keys representing {net 130A, net 130B} and {net 130A, net 130C}. A secret key is associated with each pair of protected networks. For example, {net 130A, net 130C} is associated with a particular key that is used to protect the traffic between those networks. Gateway 120A does not need the subgroup key used between {net 130B, net 130C} because gateway A does not handle routes for either net 130B or net 130C. Similarly, gateways 130C and 130D only need shared subgroup keys representing {net 130A, net 130C} and {net 130B, net 130C}. In this example, the number of subgroup keys is small, but in a large Enterprise or Service Provider network organized into hundreds of sub-networks, the number of subgroup keys becomes an unwieldy number.

To provide this level of least privilege, in an embodiment, sub-group keys are assigned to sets of gateways in such a way that:

(1) all the gateways protecting any particular address share the same key, which key may be used to protect traffic to and from that address;

(2) each pair of gateways may share at least one key in common; and (3) each gateway may determine which key should be used to encrypt or decrypt each packet and will choose the key that is known to the fewest other gateways.

In an embodiment, the principle of least privilege is achieved in a scalable manner through the use of a key generation system (KGS), such as a Blom KGS. A Blom KGS is described in R. Blom, "An Optimal Class of Symmetric Key Generation Systems, Advances in Cryptology: Proceedings of Eurocrypt 84," Lecture Notes in Computer Science. Vol. 209, Springer-Verlag, Berlin, 1984, pp. 335-338, which is incorporated herein by reference as is fully disclosed herein.

A KGS provides the ability for gateways to generate private pair-wise keys between each pair of identities defined in the KGS. A KGS system, such as a Blom KGS, also provides protection against collusion of gateways. That is, an attacker must gain keying material from a set of compromised gateways before the attacker can penetrate sniffing and spoofing attacks on un-compromised gateways. The VPN administrator chooses the level of protection ("k") required for that particular VPN. Other systems generating subgroup keys may also provide advantages such as reduced communication or storage.

In an embodiment, the following steps define system operation:

(1) A group controller provides, to a gateway, the subgroup keying material for those network prefixes that are routed to the gateway. For example, in FIG. 1, gateway 120A is provided keying material for net 130A, gateway 120B is provided keying material for net 130B, and gateways 120C and 120D are provided keying material for net 130C.

(2) When gateway 120A needs to route a packet to net 130B, gateway 120A derives or generates the {net 130A, net 130B} pair-wise key, encrypts the packet with that pair-wise key, and forwards the packet according to the destination address specified in the packet.

(3) In response to receiving the packet, gateway 120B determines that the source address, specified in the packet, is included in net 130A and the destination address is included in net 130B. Gateway 120B may generate the same {net 130A, net 130B} subnet key and decrypt the packet.

2.1 Determining the KGS Identity Associated with an Address Block

One condition, in a KGS system, for creating the SA (either predictably, or on demand) is to reliably know a pair of identities before a gateway can generate the keys. In a tunnel-less VPN, an encrypting gateway does not know the identity of the decrypting gateway and vice-versa. Therefore, tunnel endpoint identities cannot be used. However, the {net 130X, KGS identity} mapping may be set in multiple ways.

In one embodiment, the {net 130X, KGS identity} mapping is distributed to each gateway from a trusted central entity (such as a group controller or the key server). For example, 10.1.1.0/24 may be mapped to 1, 10.1.2.0/24 may be mapped to 2, etc. The number (n) that immediately follows "/" indicates the first n bits in a 32-bit address. This method of explicit distribution from a trusted central entity has the advantage that only network prefixes authorized by the system administrator(s) are encrypted. Distribution may occur by a gateway restarting and requesting a mapping from the trusted central entity; the network location of the trusted central entity may be pre-configured in the gateway.

In a related embodiment, the {net 130X, KGS identity} mapping is explicitly distributed to each gateway from a route reflector, or a gateway obtains a list of routes from a module implementing a dynamic routing protocol (such as Border Gateway Protocol [BGP] or Open Shortest Path First [OSPF]). In this case, the routing infrastructure explicitly describes the mapping.

In another related embodiment, the {net 130X, KGS identity} mapping is implicit based on the prefix of a network address itself. For example, if the network is organized with a Class C address (e.g., 10.1.x.0/24) behind most gateways, then the identity of every sub-network could be implicitly taken to be the base address of the subnet (e.g., 10.1.x.0/24). Specifically, there is keying material defined for 10.1.1.0/24 and other keying material for 10.1.2.0/24, etc. The scope of the keying material may be (a) relaxed using a policy defined as 10.1.0.0/16 identity mask length/16 or (b) tightened using a policy such as 10.1.0.0/16 identity mask length/26. The first element of the policy 10.1.0.0/16 defines the range of addresses that require a security key. The second element of the policy specifies the scope of an identity within range of address defined by the policy where a key is created for each identity. The relaxed policy requires fewer keys compared to the tightened policy. Under the relaxed policy of 10.1.0.0/16 identity mask length/16, gateway(s) protecting 10.1.1.0/24 and 10.1.2.0/24 would have the same keying material. In contrast, under the tightened policy of 10.1.0.0/16 identity mask length/26, distinct keying material is created for 10.1.1.0/26, 10.1.1.64/26, 10.1.128/26, 10.1.1.192/26, as well as 10.1.2.0/26, 10.1.2.64/26, 10.1.2.128/26, and 10.1.2.192/26 because the policy 10.1.0.0/16 identity mask length 26 dictates that a unique pair-wise key is needed for every block of 64 addresses under network 10.1.0.0/16. This flexibility gives a VPN administrator control over the degree of security from a single key for all subnets (the default case for GET VPN) to a unique key per host (e.g., policy defined as 0.0.0.0/0 identity mask length 32). The administrator may trade off between the level of security versus the memory and complexity of managing discrete keys.

In a further embodiment, the {net 130X, KGS identity} mapping is based on a combination of explicit and implicit methods. For example, a gateway determines whether there is appropriate mapping that has been provided to the gateway (e.g., by either a trusted central entity, or by routing), and if there is no such mapping, then the gateway uses an implicit mapping based on the prefix, as described above.

2.2 KGS Identity Semantics

Certain semantics regarding a KGS identity are present when a KGS is used in embodiments of the invention. First, as described previously, each distinct address block is mapped to a unique KGS identity.

Second, protection against collusion requires that fewer than "k" KGS identities are compromised by an attacker, where "k" is a parameter of the KGS system. In other words, the total number of KGS identities held by the devices compromised by an attacker must be less than "k". The reason for this requirement is that when a device holds a KGS identity, the device holds the secret keying information associated with that identity. Thus, when the device is compromised, all of the secret keying information associated with all of the KGS identities held by the device is compromised. Because the KGS identity is associated with an address block, no one gateway should be given more than "k" identities. More generally, group policy should define the maximum number of KGS identities that can be allocated to any one gateway. Some gateways, such as those protecting large corporate sites, will have multiple distinct address blocks behind them. Such address blocks may be accommodated by mapping the entire address block to a single KGS identity rather than a set of smaller KGS identities.

Third, the list of gateways authorized to advertise each address block should be known to the key server (or an adjunct server relied upon by the key server). This authorization can be determined various ways. For example, an address block may be (a) manually configured on the key server, (b) imported from a static routing policy definition, or (c) supplied by the gateway that is configured to protect the subnet that corresponds to the address block.

In an embodiment, for added reliability, a group key is provided to and shared by each of the gateways. A gateway uses the group key if there is no other matching key. This group key may be logically equivalent to the default address.

2.3 Multiple KGS Identities Behind a Single VPN Gateway

Figure 1B:
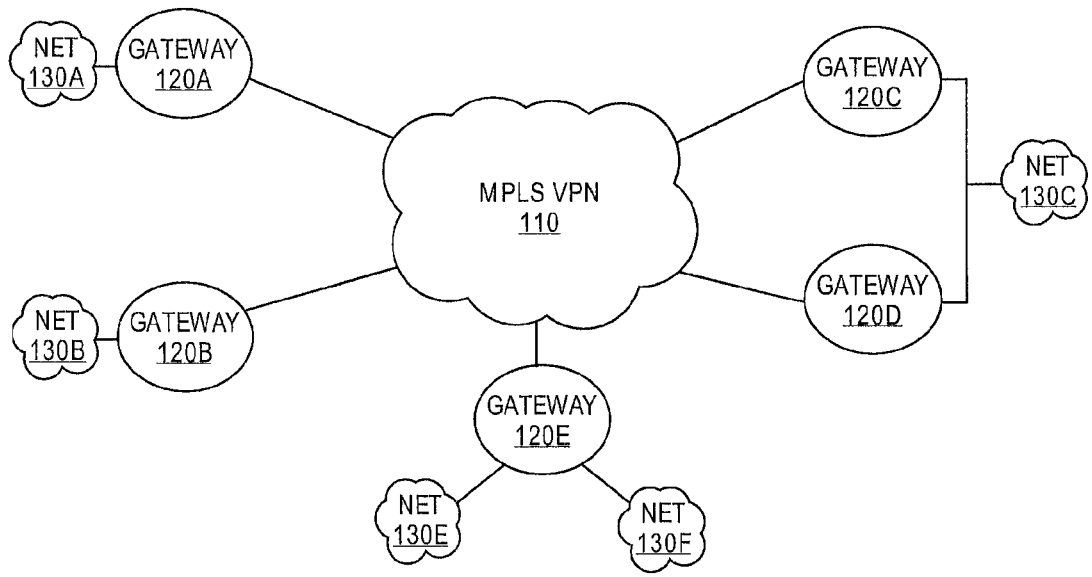

FIG. 1B is a diagram that depicts the same network elements as depicted in FIG. 1A and additionally depicts a gateway 120E and nets 130E and 130F that reside behind gateway 130E. Gateway 120E may be provided keying material that is used for both nets 130E and 130F. In that case, nets 130E and 130F would share the same KGS identity. One reason why a gateway may use the same keying material for multiple address blocks is to reduce the amount of effective keys that must be generated. A VPN administrator may choose to group nets 130E and 130F under the same mapping, especially if nets 130E and 130F are relatively small.

Alternatively, gateway 120E may be provided with keying material for net 130E and different keying material for net 130F. In that case, net 130E and net 130F would be associated with different KGS identities. One reason why a gateway may have multiple keying materials, one for each different address block behind the gateway, is to allow for different levels of trust. For example, all voice endpoints may be in net 130E and all financial databases may be in net 130F. Then, any communication with endpoints in net 130F may be given a higher level of encryption and thus require a key that is different than the key that is used with the voice endpoints in net 130E.

2.4 Example Packet Processing at a VPN Gateway

Figure 2A:
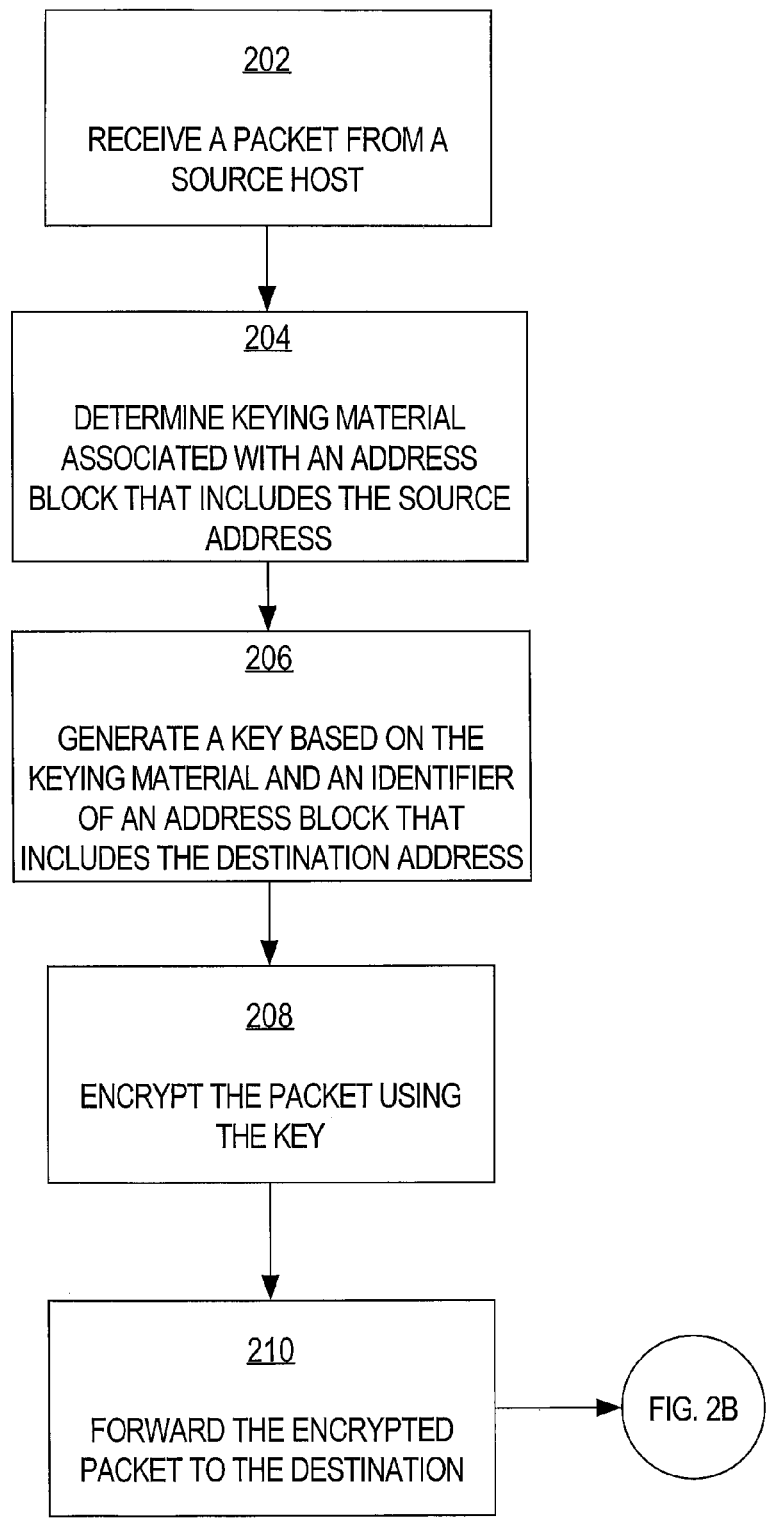
FIG. 2A and FIG. 2B illustrate an example process for processing a packet at a source gateway and at a destination gateway in a tunnel-less VPN.
Figure 2B:
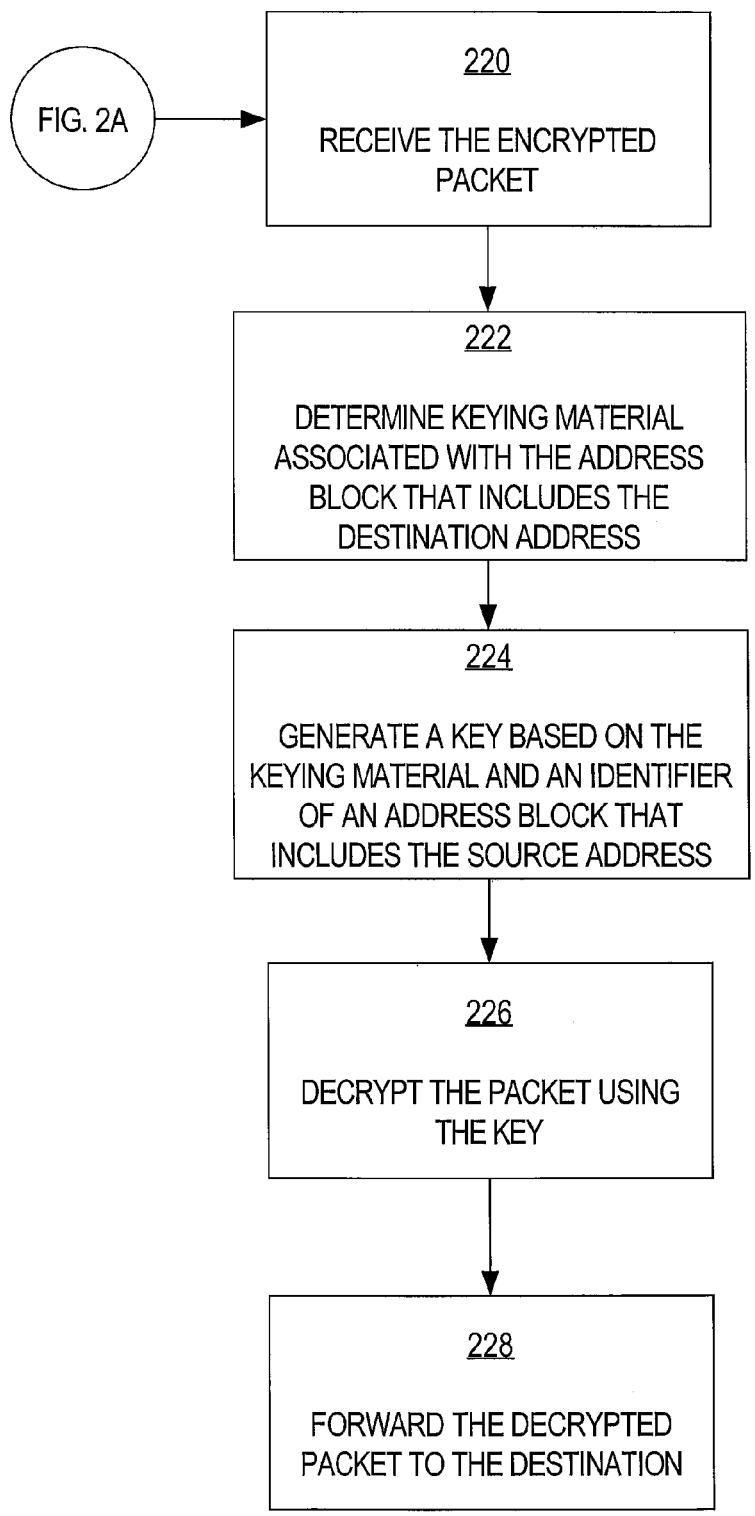

FIG. 2A and FIG. 2B illustrate an example process for processing a packet at a source gateway and at a destination gateway in a tunnel-less VPN. In this example, the source gateway is gateway 120A and the destination gateway is gateway 120E. However, the approaches described herein are broadly applicable to contexts other than those shown in FIG. 1A, FIG. 1B.

At step 202, a packet is received from a host (source host) in net 130A. The packet includes the address of the source host and a destination address of a host (destination host) in net 130F.

At step 204, gateway 120A determines keying material that is associated with an address block (e.g., network prefix) that includes the source address. In the present example, gateway 120A may only have one set of keying material because net 130A is associated with a single KGS identity and no other nets may reside behind gateway 120A. Alternatively, other nets may reside behind gateway 120A, and one or more of those other nets may be associated with a different KGS identity than the KGS identity of net 130A. In that case, step 204 may comprise determining the address block associated with the source address and using a mapping to identify the appropriate keying material associated with that address block.

At step 206, gateway 120A generates a key based on (1) the keying material determined in step 204 and (2) an identifier associated with an address block (e.g., network prefix) that includes the destination address. This step may comprise determining the KGS identity associated with the address block that includes the destination address. In this example, gateway 130A determines that net 130F includes the destination address. The KGS identity is used in combination with the determined keying material to generate the key. If gateway 120A has previously generated a pair-wise key between net 130A and 130F, then gateway 120A may have stored, e.g., in a cache, that key. Thus, gateway 120A may use a cached key to encrypt a packet without having to re-generate the key.

In an embodiment, gateway 120A uses the key in Internet Protocol Security (IPSec) and Encapsulating Security Payload (ESP).

At step 208, gateway 120A encrypts the packet using the key generated (or retrieved) in step 206.

At step 210, gateway 120A forwards the encrypted packet to the destination host, which resides in net 130F. As FIG. 2A indicates, the process continues to FIG. 2B.

At step 220, gateway 120E receives the encrypted packet and identifies the source and destination addresses.

At step 222, gateway 120E determines the keying material associated with the address block that includes the destination address. In the present example, gateway 120A may use the same keying material for both nets 130E and 130F. Thus, nets 130E and 130F would be associated with a single KGS identity. In that case, step 222 may simply involve gateway 120E accessing the only keying material to which it has access.

Alternatively, nets 130E and 130F may be associated with different KGS identities. In that case, step 222 may comprise determining the address block associated with the destination address and using a mapping to identify the appropriate keying material associated with that address block. In the present example, gateway 120E determines that the address block associated with net 130F includes the destination address. Gateway 120E then identifies the keying material associated with net 130F.

At step 224, gateway 120E generates a key based on (1) the keying material determined in step 222 and (2) an identifier associated with the address block that includes the source address. This step includes determining the KGS identity associated with the address block. Thus, the KGS identity of net 130A is used in combination with the determined keying material to generate the key. If gateway 120E has previously generated a pair-wise key between net 130A and 130F, then gateway 120E may have stored, e.g., in a cache, that key. Thus, gateway 120E may use a cached key to encrypt a packet without having to re-generate the key.

At step 226, gateway 120E decrypts at least a portion of the packet (e.g., the payload) using the key generated (or retrieved) in step 224.

At step 228, gateway 120E forwards the decrypted packet to the destination host in net 130F.

2.5 Multiple KGS Systems

In an embodiment, two or more independent KGS systems operate in parallel. For example, consider address blocks A, B, and C. A group controller provides each of multiple gateways two different sets of keying material, each of which is associated with a set of address blocks pairs. The first keying material is used to protect traffic between address blocks A and B, and the second keying material is used to protect traffic between address blocks A and C. In this case, each KGS system is associated with its own mapping that maps the identity of the KGS system and destination address blocks. In this example, the following mappings may exist on the gateway that protects address block A: {KGS1, B}, {KGS2, C}. (In a likely scenario, there would be a set of multiple destination identities associated with each KGS, e.g., {KGS1, B, D, F, K}). The mappings may comprise one or more specified address blocks or one or more KGS identifiers or both.

Thus, when the gateway that protects address block A selects which keying material to use to encrypt an outbound packet, that gateway considers the destination address of that packet. If the destination is in address block B, then that gateway determines, from the mappings, that the first keying material associated with KGS1 must be used. If the destination is in address block C, then that gateway determines, from the mappings, that the second keying material associated with KGS2 must be used.

2.6 Benefits

Tunnel-less VPNs are a scalable VPN method. Embodiments restrict the availability of keys in a way which limits damage to the VPN to only those gateways that have been compromised. In other words, the damage to a single compromised gateway is no worse than damage when a single IKE/IPsec VPN gateway is compromised.

Another benefit of certain embodiments is that only keys that are necessary are generated. For example, if no packets are sent between net 130A and net 130C, then a pair-wise key for such communication does not have to be generated. In contrast, in some implementations of "tunneled" VPNs, a key for each pair of gateways in the VPN is generated and distributed to each gateway in anticipation of where packets might be sent.

In some embodiments, secure communication may be viewed as a sliding bar. On one extreme, a group key is shared among all gateways in a tunnel-less VPN, such as in GET VPN. However, the probability of an attacker comprising a single gateway and, thus, the entire VPN is relatively high. On the other extreme, each gateway is provided a separate key for every other gateway, such as in a typical "tunneled" VPN. However, the number of resources required in this approach in addition to the disadvantages inherent in tunneled" VPNs is undesirable.

In certain embodiments, an intermediate level of security may be achieved. For example, defining a relaxed policy (e.g., 10.1.0.0/16 identity mask length/16) effectively groups multiple network prefixes and associates those network prefixes with a single KGS identity. This example is closer to the first extreme than the second extreme. On the other hand, defining a tightened policy (e.g., 10.1.1.0/16 identity mask length/26) effectively creates multiple groups of address blocks from a single network prefix. This example is closer to the second extreme than the first extreme. A VPN administrator may "slide the bar" (i.e., relax or tighten the policies by adjusting the identity mask length) over time, depending on the needs and state of the VPN.

Embodiments may be used with a symmetric KGS. In that case, embodiments may provide a collusion-protection when fewer than "k" gateways are compromised, where "k" is the tunable threshold parameter of the KGS system. Embodiments, when used with the symmetric KGS, also provide many efficiencies in the key generation and distribution process because only necessary keys are generated.

3.0 Implementation Mechanisms—Hardware Overview

Figure 3:
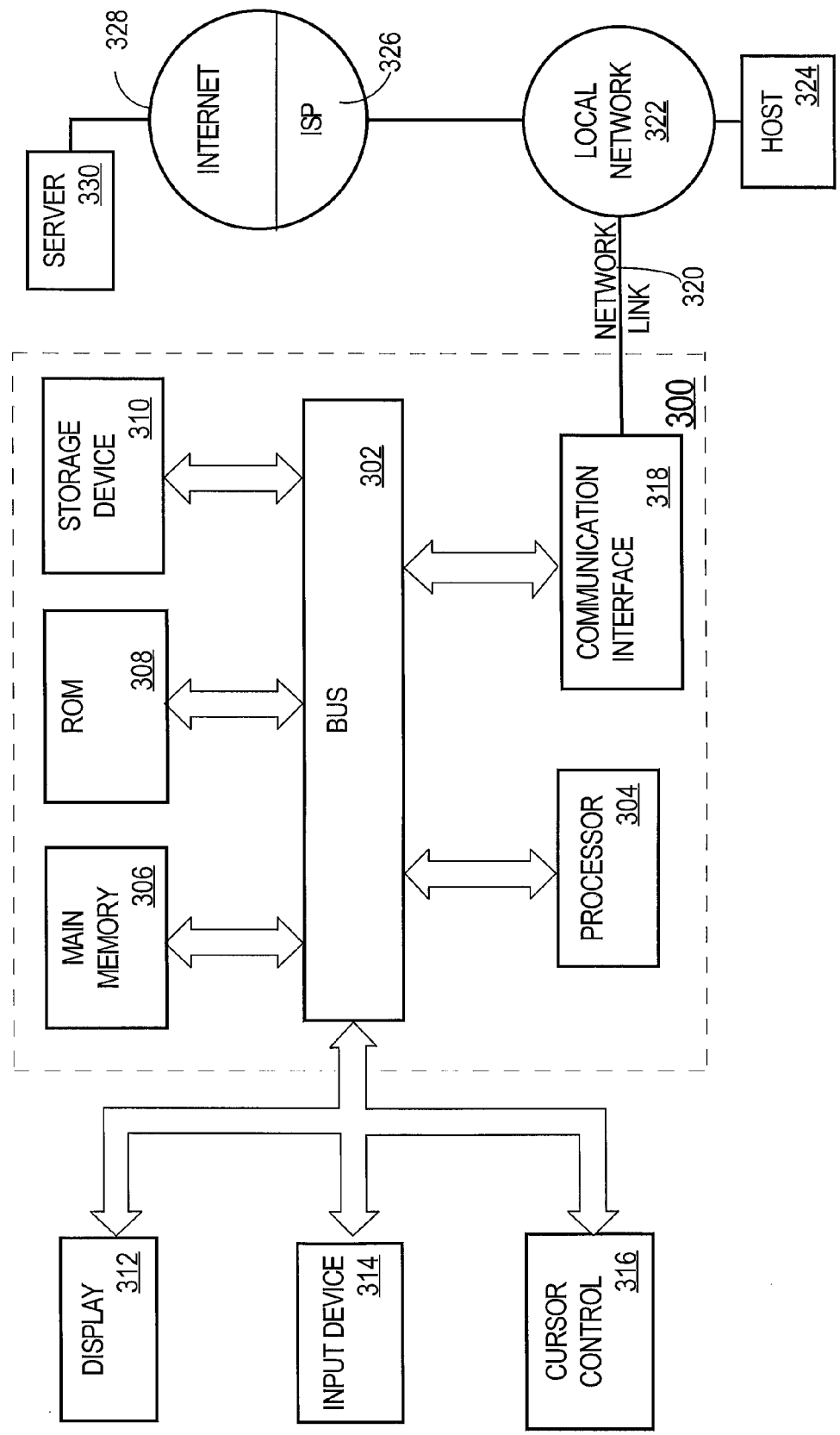
FIG. 3 depicts a computer system upon which an embodiment of the invention may be implemented.

FIG. 3 is a block diagram that depicts a computer system 300 upon which an embodiment of the invention may be implemented.

Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, or any other memory chip or cartridge.

Various forms of machine-readable storage media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code.

4.0 Extensions and Alternatives

In the foregoing specification, embodiments of the invention have been described with reference to numerous specific details that may vary from implementation to implementation. For example, applications other than event correlation may use logical topological links in a virtual network to bypass unmanaged segments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory machine-readable storage medium storing instructions which, when executed by one or more processors, cause:
  receiving, at a VPN gateway in a tunnel-less Virtual Private Network (VPN), a packet that originated at a source host and that includes a source address of the source host and a destination address of a destination host;
  determining a particular identifier associated with a destination address block that corresponds to a plurality of addresses and that includes the destination address, wherein the particular identifier does not identify any gateway in the tunnel-less VPN;
  generating a particular key based on keying material and the particular identifier;
  using the particular key to encrypt or to provide integrity protection on the packet; and
  forwarding the encrypted or integrity-protected packet to the destination host.

2. The machine-readable storage medium of claim 1, wherein:
  generating the particular key includes identifying, based on a source address block that includes the source address, the keying material from a plurality of keying materials; and
  each keying material of the plurality of keying materials is associated with a different source address block of a plurality of source address blocks that the VPN gateway protects.

3. The machine-readable storage medium of claim 1, wherein:
  the VPN gateway is associated with a plurality of key generation systems (KGSs);
  generating the particular key includes identifying, based on the destination address block, the keying material from a plurality of keying materials;
  each keying material of the plurality of keying materials is associated with a different set of one or more destination address blocks;
  the instructions include additional instructions which, when executed by the one or more processors, further cause:
    receiving, at the VPN gateway in the tunnel-less VPN, a second packet that originated at a second source host and that includes a second source address of the second source host and a second destination address of a second destination host, wherein the second destination address is included in a third address block that is different than the destination address block;
    determining a second identifier associated with the third address block, wherein the second identifier is different than the particular identifier;
    identifying, based on the third address block, second keying material from the plurality of keying materials, wherein the second keying material is different than the keying material;
    generating a second key based on the second keying material and the second identifier, wherein the second key is different than the particular key;
    using the second key to encrypt or to provide integrity protection on the second packet; and
    forwarding the encrypted or integrity-protected second packet to the second destination host.

4. The machine-readable storage medium of claim 1, wherein the instructions include additional instructions which, when executed by the one or more processors, further cause:
  storing the particular key in association with the particular identifier;
  receiving, at the VPN gateway, from a second source host, a second packet that includes a second source address of the second source host and a second destination address of a second destination host, wherein the second destination address is different than the destination address;
  determining that the destination address block includes the second destination address;
  in response to determining that the destination address block includes the second destination address, retrieving the particular key;
  without generating another key, using the particular key to encrypt or to integrity protect the second packet; and
  forwarding the encrypted or integrity-protected second packet to the second destination host.

5. The machine-readable storage medium of claim 1, wherein determining the particular identifier includes determining that the destination address block includes the destination address and determining the particular identifier based on a mapping between the destination address block and the particular identifier, wherein the instructions include additional instructions which, when executed by the one or more processors, further cause:
  receiving, at the VPN gateway in the tunnel-less VPN, a second packet that originated at a second source host and that includes a second source address of the second source host and a second destination address of a second destination host, wherein the second destination address is included in a third address block that is different than the destination address block;
  determining a third identifier associated with the third address block, wherein the third identifier is different than the particular identifier;
  generating a second key based on the third identifier, wherein the second key is different than the particular key;
  using the second key to encrypt or to provide integrity protection on the second packet; and
  forwarding the encrypted or integrity-protected second packet to the second destination host.

6. A data processing apparatus comprising:
  one or more processors;
  a machine-readable storage medium coupled to the one or more processors and storing instructions which, when executed by the one or more processors, cause the one or more processors to perform:
  receiving, at a VPN gateway in a tunnel-less Virtual Private Network (VPN), a packet that originated at a source host and that includes a source address of the source host and a destination address of a destination host;
  determining a particular identifier associated with a destination address block that corresponds to a plurality of addresses and that includes the destination address, wherein the particular identifier does not identify any gateway in the tunnel-less VPN;
  generating a particular key based on keying material and the particular identifier;
  using the particular key to encrypt or to provide integrity protection on the packet; and
  forwarding the encrypted or integrity-protected packet to the destination host.

7. The data processing device of claim 6, wherein:
generating the particular key includes identifying, based on a source address block that includes the source address, the keying material from a plurality of keying materials; and
each keying material of the plurality of keying materials is associated with a different source address block of a plurality of source address blocks that the VPN gateway protects.

8. The data processing device of claim 6, wherein:
the VPN gateway is associated with a plurality of key generation systems (KGSs);
generating the particular key includes identifying, based on the destination address block, the keying material from a plurality of keying materials;
each keying material of the plurality of keying materials is associated with a different set of one or more destination address blocks;
the instructions include additional instructions which, when executed by the one or more processors, further cause:
receiving, at the VPN gateway in the tunnel-less VPN, a second packet that originated at a second source host and that includes a second source address of the second source host and a second destination address of a second destination host, wherein the second destination address is included in a third address block that is different than the destination address block;
determining a second identifier associated with the third address block, wherein the second identifier is different than the particular identifier;
identifying, based on the third address block, second keying material from the plurality of keying materials, wherein the second keying material is different than the keying material;
generating a second key based on the second keying material and the second identifier, wherein the second key is different than the particular key;
using the second key to encrypt or to provide integrity protection on the second packet; and
forwarding the encrypted or integrity-protected second packet to the second destination host.

9. The data processing device of claim 6, wherein the instructions include additional instructions which, when executed by the one or more processors, further cause the one or more processors to perform:
storing the particular key in association with the particular identifier;
receiving, at the VPN gateway, from a second source host, a second packet that includes a second source address of the second source host and a second destination address of a second destination host, wherein the second destination address is different than the destination address;
determining that the destination address block includes the second destination address;
in response to determining that the destination address block includes the second destination address, retrieving the particular key;
without generating another key, using the particular key to encrypt or to integrity protect the second packet; and
forwarding the encrypted or integrity-protected second packet to the second destination host.

10. The data processing device of claim 6, wherein determining the particular identifier includes determining that the destination address block includes the destination address and determining the particular identifier based on a mapping between the destination address block and the particular identifier, wherein the instructions include additional instructions which, when executed by the one or more processors, further cause:
receiving, at the VPN gateway in the tunnel-less VPN, a second packet that originated at a second source host and that includes a second source address of the second source host and a second destination address of a second destination host, wherein the second destination address is included in a third address block that is different than the destination address block;
determining a third identifier associated with the third address block, wherein the third identifier is different than the particular identifier;
generating a second key based on the third identifier, wherein the second key is different than the particular key;
using the second key to encrypt or to provide integrity protection on the second packet; and
forwarding the encrypted or integrity-protected second packet to the second destination host.

11. A non-transitory machine-readable storage medium storing instructions which, when executed by one or more processors, cause the one or more processors to perform:
receiving, at a VPN gateway in a tunnel-less Virtual Private Network (VPN), a packet that includes a source address of a source host and a destination address of a destination host;
determining a particular identifier associated with a source address block that corresponds to a plurality of addresses and that includes the source address, wherein the particular identifier does not identify any gateway in the tunnel-less VPN;
generating a particular key based on keying material and the particular identifier;
using the particular key to decrypt or to integrity check the packet; and
forwarding the decrypted or integrity-checked packet to the destination host.

12. The machine-readable storage medium of claim 11, wherein:
generating the particular key includes identifying, based on a destination address block that includes the destination address, the keying material from a plurality of keying materials; and
each keying material of the plurality of keying materials is associated with a different destination address block of a plurality of destination address blocks that the VPN gateway protects.

13. The machine-readable storage medium of claim 11, wherein:
the VPN gateway is associated with a plurality of key generation systems (KGSs);
generating the particular key includes identifying, based on the source address block, the keying material from a plurality of keying materials; and
each keying material of the plurality of keying materials is associated with a different set of one or more source address blocks;
the instructions include additional instructions which, when executed by the one or more processors, further cause:
receiving, at the VPN gateway in the tunnel-less VPN, a second packet that originated at a second source host and that includes a second source address of the second source host and a second destination address of a second destination host, wherein the second source address is included in a third address block that is different than the source address block;
determining a second identifier associated with the third address block, wherein the third identifier is different than the particular identifier;
identifying, based on the third address block, second keying material from the plurality of keying materials, wherein the second keying material is different than the keying material;
generating a second key based on the second keying material and the second identifier, wherein the second key is different than the particular key;
using the second key to decrypt or integrity-check the second packet; and
forwarding the decrypted or integrity-checked second packet to the second destination host.

14. The machine-readable storage medium of claim 11, wherein the instructions include additional instructions which, when executed by the one or more processors, further cause:
storing the particular key in association with the identifier;
receiving, at the VPN gateway, from a second source host, a second packet that includes a second source address of the second source host and a second destination address of a second destination host, wherein the second destination address is different than the destination address;
determining that the source address block includes the second source address;
in response to determining that the source address block includes the second source address, retrieving the particular key;
without generating another key, using the particular key to decrypt or to integrity protect the second packet; and
forwarding the decrypted or integrity-checked the second packet to the second destination host.

15. The machine-readable storage medium of claim 11, wherein determining the particular identifier includes determining that the source address block includes the source address and determining the particular identifier based on a mapping between the source address block and the particular identifier, wherein the instructions include additional instructions which, when executed by the one or more processors, further cause:
receiving, at the VPN gateway in the tunnel-less VPN, a second packet that originated at a second source host and that includes a second source address of the second source host and a second destination address of a second destination host, wherein the second source address is included in a third address block that is different than the source address block;
determining a second identifier associated with the third address block, wherein the second identifier is different than the particular identifier;
generating a second key based on the second identifier, wherein the second key is different than the particular key;
using the second key to decrypt or to integrity check the second packet; and
forwarding the decrypted or integrity-checked second packet to the second destination host.

16. A data processing apparatus comprising:
one or more processors;
a machine-readable storage medium coupled to the one or more processors and storing instructions which, when executed by the one or more processors, cause the one or more processors to perform:
receiving, at a VPN gateway in a tunnel-less Virtual Private Network (VPN), a packet that includes a source address of a source host, a destination address of a destination host ;
determining a particular identifier associated with a source address block that corresponds to a plurality of addresses and that includes the source address, wherein the particular identifier does not identify any gateway in the tunnel-less VPN;
generating a particular key based on keying material and the particular identifier;
using the particular key to decrypt or to integrity check the packet; and
forwarding the decrypted or integrity-checked packet to the destination host.

17. The data processing apparatus of claim 16, wherein:
generating the particular key includes identifying, based on a destination address block that includes the destination address, the keying material from a plurality of keying materials; and
each keying material of the plurality of keying materials is associated with a different destination address block of a plurality of destination address blocks that the VPN gateway protects.

18. The data processing apparatus of claim 16, wherein:
the VPN gateway is associated with a plurality of key generation systems (KGSs);
generating the particular key includes identifying, based on the source address block, the keying material from a plurality of keying materials; and
each keying material of the plurality of keying materials is associated with a different set of one or more source address blocks.

19. The data processing apparatus of claim 16, wherein the instructions include additional instructions which, when executed by the one or more processors, further cause the one or more processors to perform:
storing the particular key in association with the identifier;
receiving, at the VPN gateway, from a second source host, a second packet that includes a second source address of the second source host and a second destination address of a second destination host, wherein the second destination address is different than the destination address;
determining that the source address block includes the second source address;
in response to determining that the source address block includes the second source address, retrieving the particular key;
without generating another key, using the particular key to decrypt or to integrity protect the second packet; and
forwarding the decrypted or integrity-checked the second packet to the second destination host.

20. The machine data processing apparatus of claim 16, wherein determining the particular identifier includes determining that the source address block includes the source address and determining the particular identifier based on a mapping between the source address block and the particular identifier, wherein the instructions include additional instructions which, when executed by the one or more processors, further cause the one or more processors to perform:
receiving, at the VPN gateway in the tunnel-less VPN, a second packet that originated at a second source host and that includes a second source address of the second source host and a second destination address of a second destination host, wherein the second source address is included in a third address block that is different than the source address block;

determining a second identifier associated with the third address block, wherein the second identifier is different than the particular identifier;

generating a second key based on the second identifier, wherein the second key is different than the particular key;

using the second key to decrypt or to integrity check the second packet; and forwarding the decrypted or integrity-checked second packet to the second destination host.

21. A system comprising:

a first Virtual Private Network (VPN) gateway in a tunnel-less VPN;

a second VPN gateway in the tunnel-less VPN;

wherein the first VPN gateway is configured to perform:

receiving a packet that originated at a source host and that includes a source address of the source host and a destination address of a destination host;

determining a destination identifier associated with a destination address block that corresponds to a first plurality of addresses and that includes the destination address, wherein the particular identifier does not identify any gateway in the tunnel-less VPN;

generating a first key based on first keying material and the destination identifier;

using the first key to encrypt or to integrity protect the packet; and forwarding the encrypted or integrity-protected packet to the destination host;

wherein the second VPN gateway is configured to perform:

receiving the encrypted or integrity-protected packet;

determining a source identifier associated with a source address block that corresponds to a second plurality of addresses and that includes the source address;

generating a second key based on the first keying material and the source identifier, wherein the first key is identical to the second key;

using the second key to decrypt or to integrity protect the packet; and forwarding the decrypted or integrity-checked packet to the destination host.

22. The system of claim 21, wherein the first VPN gateway is further configured to perform:

receiving a second packet that originated at a second source host and that includes a second source address of the second source host and a second destination address of a second destination host, wherein the second destination address is included in a third address block that is different than the destination address block;

determining a third identifier associated with the third address block, wherein the third identifier is different than the destination identifier;

generating a third key based on the third identifier, wherein the third key is different than the first key;

using the third key to encrypt or to integrity protect the second packet; and forwarding the encrypted or integrity-protected second packet to the second destination host.

* * * * *